United States Patent Office 3,457,427
Patented July 22, 1969

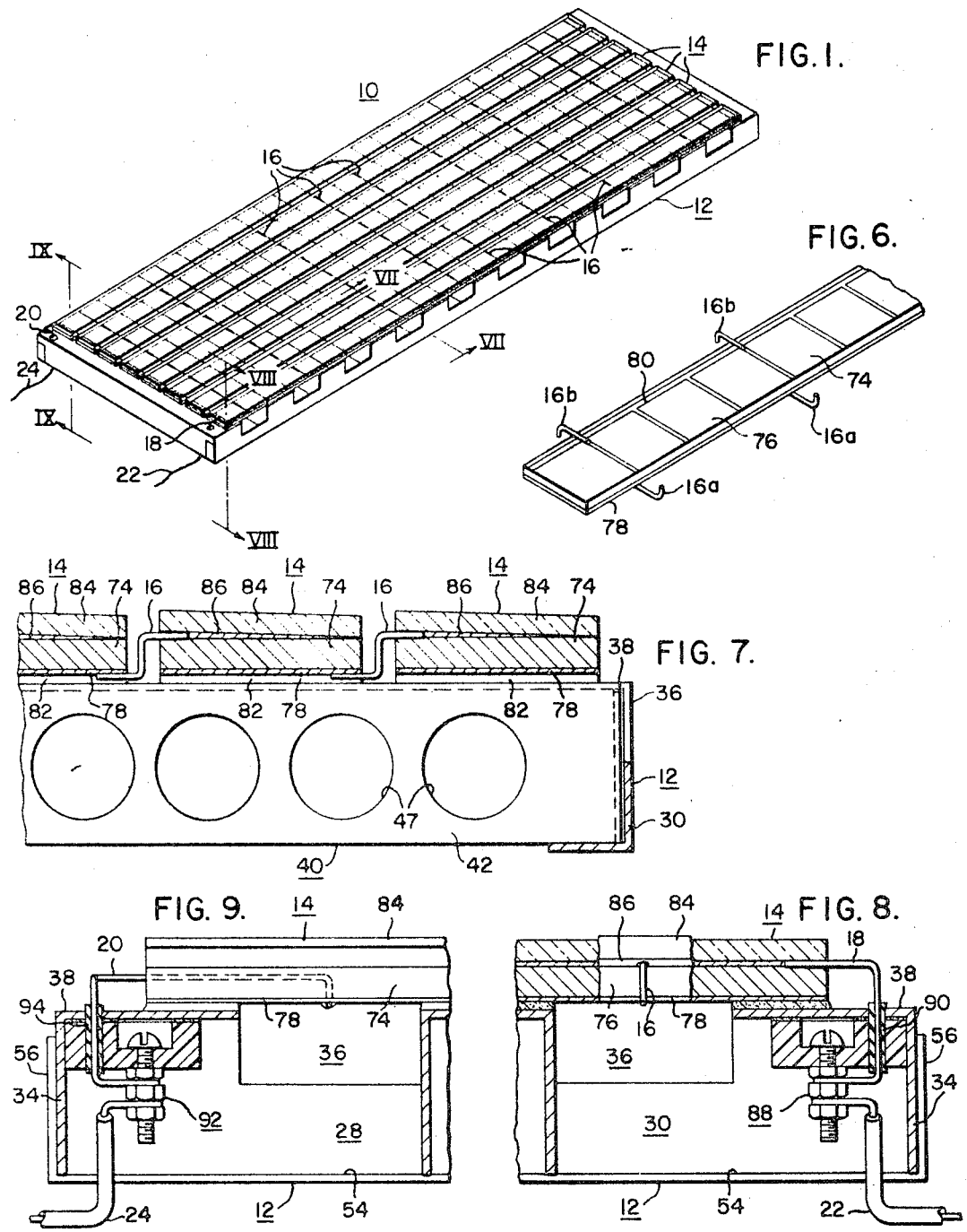

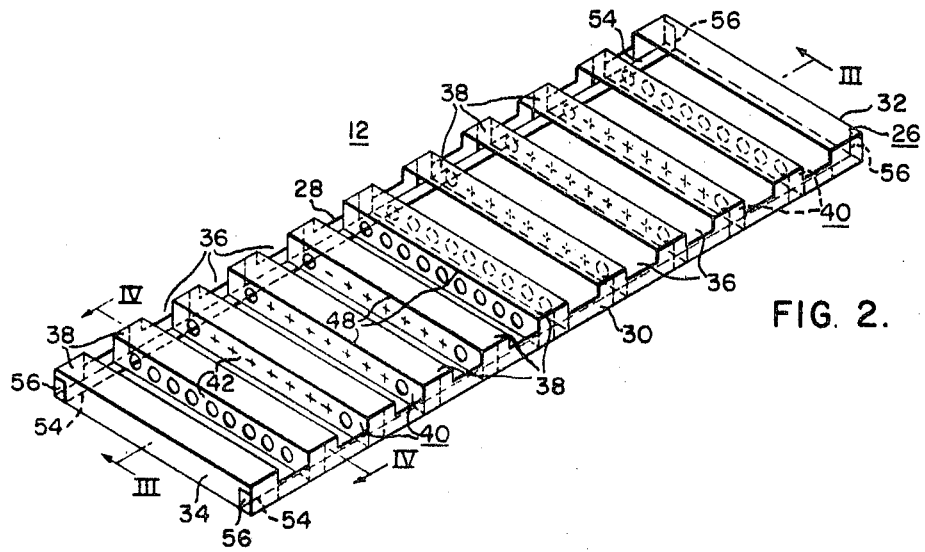
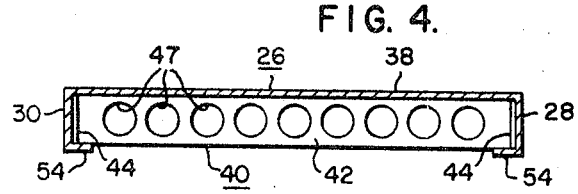
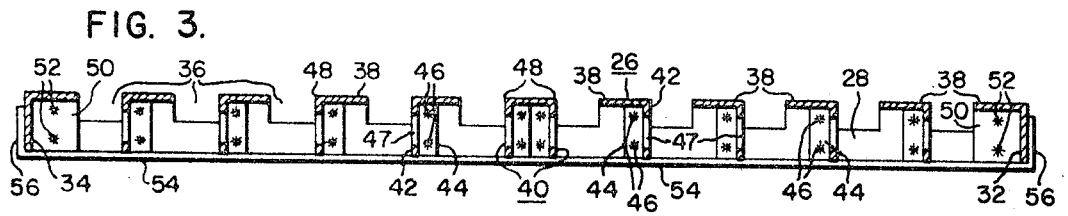
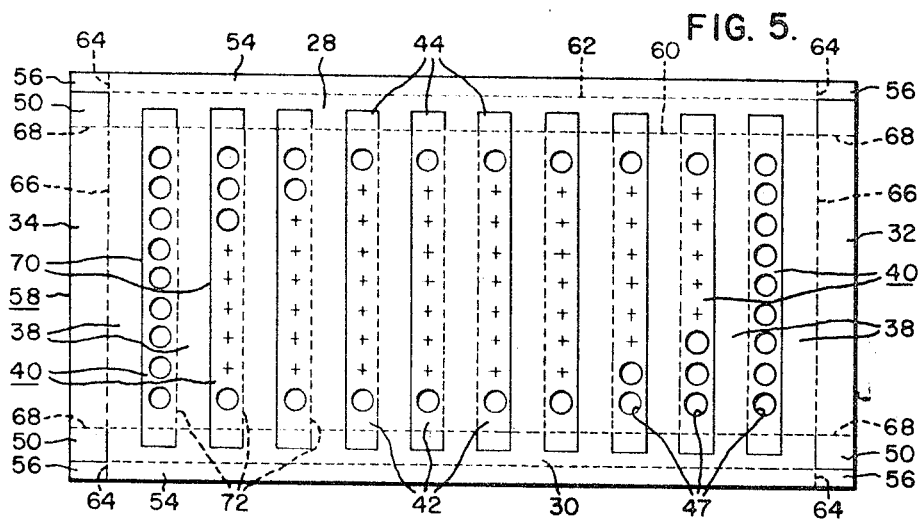

3,457,427
LIGHTWEIGHT SOLAR CELL PANEL STRUCTURE
Krishan S. Tarneja, Pittsburgh, Vito A. Rossi, Greensburg, and Joseph R. Maddalena, Jeannette, Pa., assignors to Westinghouse Electric Corporation, Pittsburgh, Pa., a corporation of Pennsylvania
Filed Aug. 20, 1965, Ser. No. 481,251
Int. Cl. H01j 5/02
U.S. Cl. 250—239
8 Claims

ABSTRACT OF THE DISCLOSURE

A substrate for supporting a plurality of webbed dendritic solar cells is formed from one piece of metal having a thickness of from 5 to 15 mils. The substrate, has the necessary strength and rigidity but is light in weight.

This invention relates to solar cell panel assemblies, and more particularly to a lightweight substrate for rigidly supporting a plurality of webbed dendrite solar cells.

With the recent advances in space flight, solar cells have gained considerable importance as a source of power. The solar cells are mounted on a substrate or supporting panel which preferably is lightweight and rigid. In the conventional design, an aluminum honeycomb substrate is provided which is formed from a plurality of individual elements secured together by means of an adhesive. The solar cells are bonded to the honeycomb structure with an organic glue or silicone adhesive at least ⅟₃₂ of an inch thick. Furthermore, the solar cells are mounted in a series string either by overlapping the edges or by laying them in side-by-side edge engagement. For space application, it is necessary to provide a protective quartz cover for the active side of the cell, i.e., the side which will face the light source. The quartz covers are secured to the upper surface of the solar cells by means of a transparent adhesive which also serves as a shield against undesired radiation.

As is known, weight is an important factor in determining the amount of thrust required to lift a space vehicle. Consequently, considerable effort has been and is being expended to produce solar cell panel assemblies which are lighter in weight, thereby increasing the number of watts of power produced per pound of the panel assembly. For the purpose of comparing the panel assembly of the invention with the panel assemblies provided by the prior art, an "overall performance figure" of a panel assembly will be used and which is defined as the number of watts of power produced by the panel assembly for each pound of the panel assembly. The present state of the art is such that 8–9 watts of power can be produced per pound of panel assembly. As will be shown, a solar cell panel assembly constructed in accordance with the invention is capable of producing the equivalent of 16.9 watts of power per pound of panel assembly. Thus, the present invention provides an increase of approximately 100% in the overall performance figure.

It should be remembered that the substrate must not only be lightweight but must also be rigid to avoid undue stressing of the solar cells. The substrate must also be capable of withstanding the vibration, shock and acceleration associated with rocket take-offs, as well as being capable of withstanding the thermal cycling experienced in space applications. Still further, fabrication of the substrate must not be unduly complicated so that its cost may be held within reasonable limits.

Accordingly, as an overall object, the present invention seeks to provide a solar cell panel assembly capable of producing a greater number of watts per pound of the panel assembly than any of the solar cell panel assemblies heretofore available.

Another object of the invention is to provide a solar cell panel assembly which is capable of withstanding the vibration, shock and acceleration associated with take-off and also capable of withstanding the thermal cycling experienced in space applications.

Another object of the invention is to provide a substrate which is formed from a single sheet of relatively thin-gage metal and is an all-welded, one-piece construction.

The above and other objects and advantages of the present invention will become apparent from the following detailed description by reference to the accompanying drawings, in which:

FIGURE 1 is an isometric view of a solar cell panel assembly constructed in accordance with the present invention;

FIG. 2 is an isometric view illustrating a substrate employed in the solar cell panel assembly of the invention;

FIG. 3 is a cross-sectional view taken along the line III—III of FIG. 2;

FIG. 4 is a cross-sectional view taken along the line IV—IV of FIG. 2;

FIG. 5 is a plan view of a single sheet of metal from which the substrate of FIG. 1 is formed and on which the cut lines and bend lines are indicated;

FIG. 6 is a fragmentary isometric view of a webbed dendritic solar cell used in the panel assembly of FIG. 1;

FIG. 7 is a cross-sectional view taken along the line VII—VII of FIG. 1; and

FIGS. 8 and 9 are cross-sectional views taken along the lines VIII—VIII and IX—IX of FIG. 1, respectively, illustrating the arrangement of output of terminals associated with the solar cell panel assembly of FIG. 1.

In accordance with the present invention, a solar cell panel assembly is provided comprising an extremely lightweight substrate supporting a plurality of webbed dendritic solar cells which may be connected electrically in series or parallel depending on the power requirements. The present solar cell panel assembly is extremely lightweight and produces a greater number of watts per pound of panel assembly than any solar cell panel assembly heretofore available.

The substrate of the invention is generally rectangular in shape and is formed from a single sheet of relatively lightweight metal by forming, pressing and like shaping techniques and is welded together. The substrate provides a plurality of substantially coplanar, transversely extending cell supporting wall members each of which is reinforced. The cell supporting wall members are longitudinally spaced to provide, in the substrate, a plurality of transverse slots.

The webbed dendritic solar cells extend longitudinally of the substrate and are secured to the cell supporting wall members preferably by means of an adhesive. Since the cell supporting wall members provide a relatively large surface area, the adhesive need only be 5 to 10 mils thick rather than being 30 mils thick as in conventional designs. The webbed dendritic solar cells are spaced apart rather than being overlapped or abutted as in the prior art. At least one and preferably a plurality of lead wires are provided for connecting the dendritic cells electrically in series. The lead wires are positioned in the region of the slots and therefore, are not subject to shorting out. A quartz cover is provided for each webbed dentritic solar cell. The quartz cover may be a single piece or a plurality of pieces. The quartz covers are secured to the upper surface of the solar cells by means of a transparent adhesive which serves additionally as a shield against radiation.

Referring now to FIG. 1, there is illustrated a solar cell panel assembly indicated generally by the numeral 10 and constructed in accordance with the present invention. The solar cell panel assembly 10 comprises a substrate or supporting structure 12 on which is secured a plurality of solar cell units 14. The solar cell units 14 extend longitudinally of the substrate 12 and are laterally spaced apart. As will be described later in the specification, each of the solar cell units 14 is connected electrically in series with the next solar cell unit 14 by means of at least one and preferably a plurality of lead wires 16. As will become apparent later in the specification, each of the lead wires 16 is connected to the upper surface of one solar cell unit 14 and has its other end secured to the lower face of the next adjacent solar cell unit 14. The first and last of the solar cell units 14 of the series string have associated therewith lead wires 18, 20 respectively, which are connected to output terminals (not visible) having output lead wires 22, 24 extending therefrom. When the solar cell panel assembly 10 is operating, an output voltage and current will be provided across the output lead wires 22, 24.

Reference is now directed to FIGS. 2–3, inclusive, wherein the substrate 12 of the invention is illustrated. As can be seen in FIG. 2, the substrate 12 has a generally rectangular configuration having an upper wall 26, depending side walls 28, 30 and end walls 32, 34.

The upper wall 26 and the side walls 28, 30 have, as will be described, portions thereof removed so as to provide a plurality of transversely extending, longitudinally spaced slots 36. The remaining portions of the upper wall 26 provide a plurality of transversely extending, longitudinally spaced cell supporting wall members 38 which, as can best be seen in FIG. 3, are substantially coplanar. Depending from each of the cell supporting wall members 38 is a rib-forming member 40 comprising a central web portion 42 terminating at each end in a flange or tab 44 overlying the side walls 28, 30 and secured thereto preferably by means of spot welds 46. Each of the rib-forming members 40 is integral with the cell supporting wall member 38 along a longitudinal edge 48. To further lighten the substrate 12, a plurality of apertures 47 are formed in the central web portions 42 of the rib-forming members 40.

As can best be seen in FIG. 3, each of the end walls 32, 34 terminates at each end in a flange or tab 50 overlying and secured to the inner surfaces of the side walls 28, 30, preferably by means of spot welds 52.

Each of the side walls 28, 30 has formed along its lower edge an inwardly extending longitudinal flange 54 terminating at each of its ends in an upturned flange or tab 56 overlying and secured to the end walls 32, 34 preferably by means of spot welding.

The overall arrangement of the substrate 12 is such that a support member for the solar cell units 14 is provided which is structurally strong and capable of withstanding the vibration, shock and acceleration associated with rocket take-offs and also can withstand the thermal cycling experienced in space applications. Another important feature of the substrate 12 is its extreme lightweight. The substrate 12 is lightweight by virtue of the fact that it is formed from a single sheet of relatively thin-gage metal. The substrate 12 may, for example, be formed from a single sheet of aluminum, magnesium, and like lightweight metals. Because of the configuration of the substrate 12, the thickness of the single sheet need only be from 5 to 10 mils.

In FIG. 5, there is illustrated a single sheet 58 of relatively thin-gage metal. On the upper surface of the single sheet 58 there is illustrated the various components of the substrate 12, described above. The lines along which the sheet 58 is to be cut are illustrated as solid lines while the lines along which the sheet 58 is to be folded or bent are illustrated as dotted lines.

As can be seen, the side walls 28, 30 and their longitudinal flanges 54 are formed from the longitudinal side edge portions of the sheet 58. The side edge portions of the sheet 58 will be bent first along the dotted line 60 to form the side walls 28, 30 and then along the dotted line 62 to form the longitudinal flanges 54. The extreme ends of the longitudinal flanges 54 will be bent along the dotted line 64 to provide the upturned flanges 56.

The end walls 32, 34 are formed from the transverse end portions of the singe sheet 58. These end portions will be bent along the dotted lines 66 to provide the end walls 32, 34 and then bent along the dotted lines 68 at each end of the end walls 32, 34 to provide the flanges 50.

The central longitudinal portion of the single sheet 58 is cut along a plurality of longitudinally spaced transversely extending cut lines 70 each of which extends into the side walls 28, 30 so as to provide the flanges 44 associated with the rib-forming members 40. The rib-forming members 40 will be bent along the transversely extending dotted lines 72. It should be evident by comparing FIGS. 2 and 5, that the transversely extending longitudinally spaced slots 36 comprise, in reality, those areas of the single sheet 58 vacated by those portions of the single sheet 58 comprising the rib-forming members 40 i.e., the central web portions 42 and the flanges 44.

Since the substrate 12 is formed from a single sheet of metal by cutting, folding and welding, the fabrication of the substrate 12 may be easily accomplished with the use of forming, pressing and like shaping techniques together with spot-welding equipment all of which are amenable to automation. Furthermore, the use of an adhesive in the fabrication of the substrate and the disadvantages associated with the use of adhesives has been completely eliminated. Still further, the fabrication of the substrate is comparatively less complicated because of its one-piece construction.

As is known, silicon solar cells are the most common type of solar cells being manufactured today. Such cells consist, for example, of a crystal wafer of silicon which has been doped, while grown, to make it either P or N-type. One face of this wafer is exposed to a vaporized dopant of the opposite type, which diffuses into the semiconductor wafer to a depth of about half a micron and in sufficient quantity to overpower the original doping and change a layer of the material to the opposite type. The result is a piece of silicon with a P-N junction about half a micron below the surface of one face.

In operation, light falling on the doped surface of the wafer is absorbed rapidly as it penetrates the silicon. Part of this absorbed radiant energy disrupts covalent atomic bonds in the crystal, producing electrons and holes in pairs. For silicon cells, for example, this requires an energy of about 1.12 electron volts, which excludes the usefulness of any radiation of wavelengths longer than 1.2 microns.

The minority carriers of the hold-electron pairs about in the region of their generation until they either recombine with the majority carriers or cross the P-N junction. The only useful carriers are those that go across the junction. They cause the crystal to become biased, with the P-type region positive and the N-type region negative. The bias causes a useful current to flow when the two regions are connected by a conductor.

The doped side of the silicon wafer which is exposed to light is in contact with an electrical conducting grid which will permit light to pass therethrough onto the surface of the wafer. The other side of the wafer is usually coated with a layer of solder. The grid on one side of the wafer and the solder on the other side of the wafer constitute the two terminals for the photovoltaic cell.

A conventional silicon solar cell measures 1 centimeter by 2 centimeters, and the power of such a cell, having an efficiency of 10% is 18 milliwatts. In order to obtain any appreciable power output, a large number of these cells are mounted on a substrate or panel and connected electrically in series or parallel depending on the power requirements.

Reference is now directed to FIG. 6 wherein there is illustrated a fragment of a semiconductor solar cell 74 used in the solar cell panel assembly 10. The solar cell 74 comprises a silicon webbed dendrite having a length which is considerably greater than its width. The solar cell dendrite 74 has a doped upper surface 76 and a layer of solder 78 provided on its lower face. The layer of solder 78 has been exaggerated in FIG. 6 for the purpose of clarity. Actually, the layer of solder 78 has a thickness of about 1 to 5 mils. An electrical conducting grid 80 is secured to the doped upper surface 76. The electrical conducting grid 80 on the upper surface and the layer of solder 78 on the lower surface form the two terminals for the solar cell dendrite 74. As stated above, one and preferably a plurality of the lead wires 16 are connected at spaced points to each of the webbed dendritic solar cell 74. As can be seen in FIG. 6, a first set of spaced lead wires 16a are soldered to the layer of solder 78 and are adapted to be connected to the electrical conducting grid of an adjacent preceding webbed dendritic solar cell. A second set of lead wires 16b are soldered to the electrical conducting grid 80 and are adapted to be connected to the layer of solder of the next adjacent webbed dendritic solar cell 74. Hence, the useful current flow is from an adjacent webbed dendritic solar cell through the first set of lead wires 16a into the webbed dendritic solar cell 74 and thence into the lead wires 16b to the next successive webbed dendritic solar cell.

Referring now to FIG. 7, there is shown a plurality of the solar cell units 14 mounted on the substrate 12. Prior to fabricating the solar cell panel assembly 10, the lead wires 16 are attached to the electrical conducting grid 80 of each of the webbed dendritic solar cells 74. Thereafter, the webbed dendritic solar cells 74 are attached to the cell supporting wall members 38 preferably by means of an adhesive 82. An adhesive suitable for use in this instance, is a room temperature vulcanizing silicon rubber such, for example, as one sold under the trade name Dow-Corning RTV Q-3-0121. It is preferred that two coats of the adhesive be used. Since there is a relatively large area of contact between the cell supporting wall members 38 and the webbed dendritic solar cells 74, the adhesive 82 need only be 5–10 mils thick as compared to the 30 mils thickness of adhesives used in conventional designs.

The panel is then cured for several hours in a vacuum oven to achieve a firm bond between the webbed dendritic solar cells 74 and the substrate 12. At the completion of curing, the several lead wires 16 are threaded between adjacent webbed dendritic solar cells 74 and are soldered to the layer of solder 78 of the next adjacent webbed dendritic solar cell 74. Attachment of the several lead wires 16 is easily accomplished since the substrate 12 has an open bottom which provides easy access to the various lead wires 16 for soldering the same to the adjacent webbed dendritic solar cells 74.

After the webbed dendritic solar cells 74 have been connected electrically in series, a quartz cover 84 is laid over the doped upper surface of each of the webbed dendritic solar cells 74 and is attached thereto preferably by means of a layer of transparent glue 86. A glue suitable for use in this instance is a transparent epoxy resin sold under the trade name EPI Bond-Transparent-15E by Furane Plastics.

As can be seen in FIG. 8, interiorly of the substrate 12 and at the corner defined, for example, by the side wall 30 and the end wall 34, there is provided an output terminal 88 which is attached to the lower face of the cell supporting wall member 38 preferably by means of the adhesive described above. The lead wire 18 is secured to the electrical conducting grid (not visible) of the first webbed dendritic solar cell 74 and extends therefrom through an insulating member 90 associated with the output terminal 88. The lead wire 18 is connected to the output terminal 88. Connected to and extending from the output terminal 88 is the output lead wire 22.

As can be seen in FIG. 9, a second output terminal 92 is provided in the corner defined, for example, by the side wall 28 and the end wall 34. The output terminal 92 is secured to the lower face of the cell supporting wall member 38 preferably by means of the adhesive described above. The lead wire 20 is soldered to the layer of solder 78 provided on the lower face of the webbed dendritic solar cell 74 and extends therefrom through an insulating member 94 associated with the output terminal 92. The lead wire 20 is connected to the output terminal 92. Connected to and extending from the output terminal 92 is the second output lead wire 24.

As a specific example, a solar cell panel assembly, having dimensions of 3¼ inches by 6¼ inches, was fabricated in accordance with the principles of the present invention. This solar cell panel assembly produced 1.45 watts of power output and weighed 39 grams. This is equivalent to 16.9 watts per pound of the panel assembly. Comparing the 16.9 watts of power output per pound of panel assembly produced by the present solar cell panel assembly to the 8 to 9 watts of power output per pound provided by solar cell panel assemblies of the prior art, it will be seen that the present solar cell panel assembly provides approximately twice the power output of the prior art solar cell panel assemblies. The solar cell panel assembly described above was tested and satisfactorily completed the environmental tests required for space applications.

Although the present invention has been shown in connection with one specific embodiment, it will be readily apparent to those skilled in the art that various changes in form and arrangement of parts may be made to suit requirements without departing from the spirit and scope of the invention.

We claim as our invention:

1. A substrate of generally rectangular configuration for supporting a plurality of webbed dendritic solar cells, said substrate consisting of a formed single sheet of relatively thin-gauge metal, said substrate having: a plurality of transverse wall members having corresponding surfaces residing substantially in a common plane and adapted to support said webbed dendritic solar cells; longitudinal side walls, said side walls connecting the ends of said transverse wall members; at least one rib-forming member depending from an edge of each of said transverse wall members and having a length substantially equal to the length of its associated transverse wall member; and means for securing the ends of said rib-forming members to said side walls, the transverse wall members being substantially uniformly spaced along the length of said substrate so as to provide a plurality of spaced, transverse slots.

2. The substrate of claim 1 wherein each of said rib-forming members has a plurality of openings therein.

3. The substrate of claim 1 wherein each of said side walls terminates along its lower edge in an inwardly extending flange engaged over the edges of said rib-forming members and having upturned end flanges engaged over and secured to the rib-forming members at the ends of said substrate.

4. A substrate of generally rectangular configuration for supporting a plurality of webbed dendritic solar cells, said substrate consisting of a formed single sheet of relatively thin-gage metal, said substrate having: a plurality of transverse wall members having corresponding surfaces residing substantially in a common plane and adapted to support said webbed dendritic solar cells; longitudinal side walls connecting ends of said transverse wall members; at least one rib-forming member depending from an edge of each of said transverse wall members and terminating at each end in a flange engaged over one of said side walls; means for securing said flanges to said side walls; said transverse wall members being substantially uniformly spaced along the length of said substrate; and each of said side walls having a groove provided therein in the space between each of said transverse wall members, the grooves in said side walls and the space between said transverse wall members cooperating to provide said substrate with a plurality of spaced, transverse slots.

5. A generally rectangular substrate for rigidly supporting a plurality of webbed dendritic solar cells, said substrate consisting of a formed single sheet of relatively thin-gage metal, said substrate having a plurality of uniformly spaced, substantially coplanar, transverse wall portions; a downwardly depending longitudinal side wall portion at the opposite ends of said transverse wall portions; said side wall portions comprising the opposite side edges of said single sheet; at least one downwardly depending, rib-forming portion integral with each of said transverse wall portions along a longitudinal edge thereof and having ends engaged with said side wall portions, each of said rib-forming portions being formed in the area of said single sheet between an adjacent pair of said transverse wall portions; and means for rigidly securing the ends of said rib-forming portions to said side wall portions, whereby a plurality of uniformly spaced, angle-shaped platforms are provided by said transverse wall portions and said rib-forming portions for supporting said webbed dendritic solar cells.

6. A generally rectangular substrate for rigidly supporting a plurality of webbed dendritic solar cells, said substrate consisting of a formed single sheet of relatively thin-gage metal, said substrate having: a plurality of longitudinally spaced, transversely extending portions of said single sheet defining a plurality of cell supporting wall members whose length is less than the width of said single sheet; said single sheet having longitudinal side edge portions which are bent downwardly along lines connecting the ends of said cell supporting wall members to define longitudinal side walls; said side walls depending generally at right angles to the plane of said cell supporting wall members; each of said cell supporting wall members having a rib-forming member integral therewith along an edge thereof; said rib-forming members being formed from the transversely extending portions of said single sheet residing in the regions between those portions of said single sheet from which said cell supporting wall members are formed; said rib-forming members being bent downwardly and generally at right angles to the plane of said cell supporting wall members; said rib forming members having flanges which project beyond the ends of said cell supporting wall members and which comprise portions of said side walls, the flanges being being generally at right angles to the plane of said rib-forming members and being rigidily secured to said side walls; and the space between said cell supporting wall members and said side walls vacated by said rib-forming members and said flanges comprising a plurality of transversely extending, longitudinally spaced slots.

7. The substrate of claim 6 wherein the lower edge of each side wall is bent inwardly into engagement with the lower edges of said rib-forming members and said flanges and terminates at each end in an upwardly bent end portion engaged over and secured to the rib-forming members at each end of said substrate.

8. A solar cell panel comprising in combination: a generally rectangular substrate consisting of a singe sheet of relatively thin-gage metal, said substrate comprising an upper wall having integrally formed therein longitudinal side walls and transverse end walls, a plurality of rib-forming members depending from said upper wall, each of said rib-forming members having a central web comprising a portion of said upper wall which is integral therewith along a longitudinal edge thereof and end flanges comprising portions of said side walls which are engaged with and rigidly secured to said side walls, the areas of said upper wall and said side walls vacated by said central web and said end flanges providing a plurality of transversely extending slots in said substrate, the remaining portions of said upper wall comprising a plurality of uniformly spaced, substantially coplanar cell supporting members; a plurality of solar cell dendrite assemblies extending longitudinlally over said cell supporting members and secured thereto in laterally spaced, parallel relation; means positioned in the region of said slots for electrically interconnecting said solar cell dendrite assemblies; a pair of output terminals secured to said substrate; and means for electrically connecting the first and last of said solar cell dendrite assemblies to said output terminals.

References Cited
UNITED STATES PATENTS

| | | | |
|---|---|---|---|
| 3,026,417 | 3/1962 | Tomlinson | 250—211 |
| 3,089,043 | 5/1963 | Gold | 250—212 |

RALPH G. NILSON, Primary Examiner

MARTIN ABRAMSEN, Assistant Examiner

U.S. Cl. X.R.

250—212